Jan. 6, 1953
A. STRAHM ET AL
2,624,071
DEVICE FOR MANUFACTURING FLEXIBLE CONTAINERS
FOR SYNTHETIC PLASTIC MATERIALS
Filed March 30, 1951
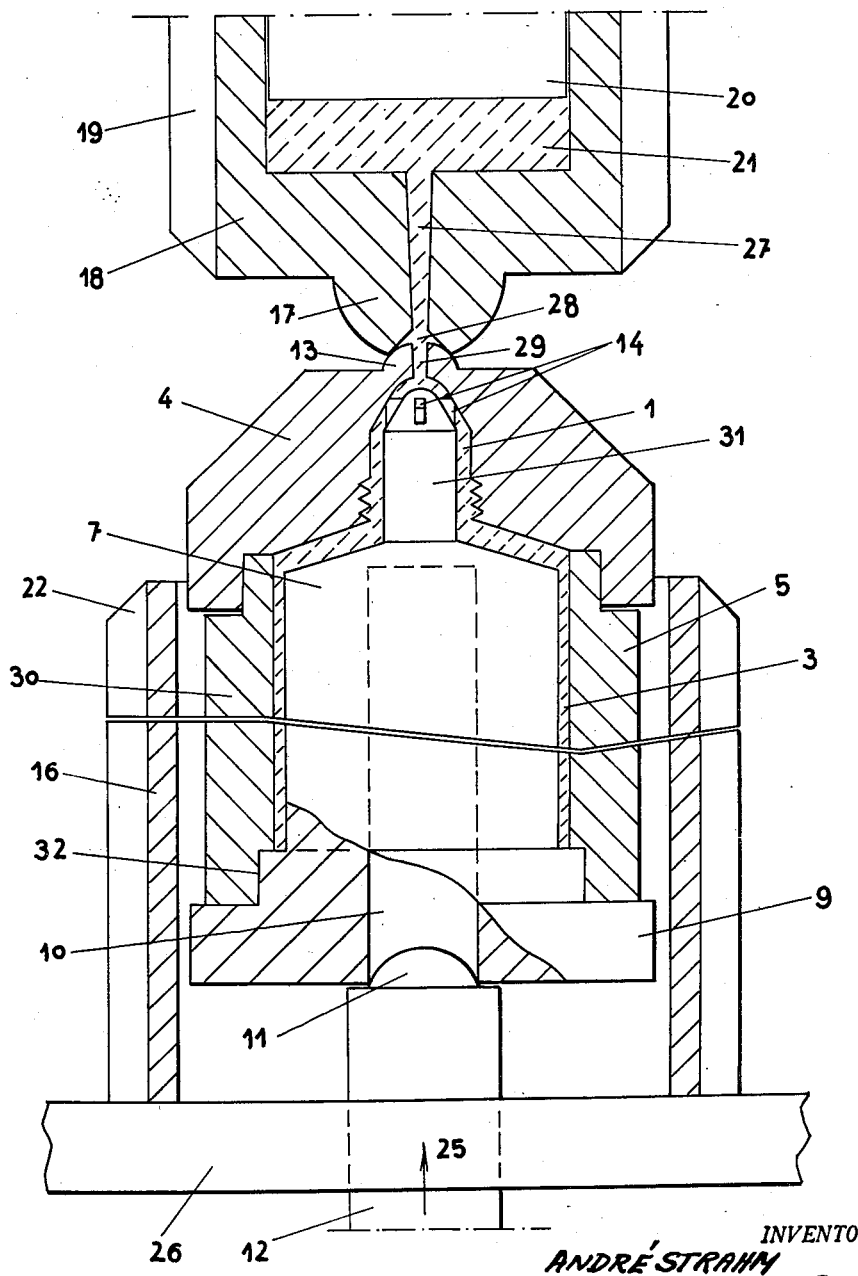
INVENTORS.
ANDRÉ STRAHM
BY ALBERT QUINCHE Patented Jan. 6, 1953

2,624,071

UNITED STATES PATENT OFFICE 2,624,071

DEVICE FOR MANUFACTURING FLEXIBLE CONTAINERS FOR SYNTHETIC PLASTIC MATERIALS

André Strahm, Villeneuve, and Albert Quinche, St. Sulpice, Switzerland, assignors to Unitubo S. A., Vevey, Switzerland, a corporation of Switzerland Application March 30, 1951, Serial No. 218,319
In Switzerland March 31, 1950

8 Claims. (Cl. 18—30)

The present invention concerns a device for manufacturing a flexible container from synthetic plastic material, for example, polyethylene. The device according to the invention comprises an injection cylinder which is provided with a heating member and in which is movable a piston intended to expel, through a discharge nozzle of said cylinder, the material to be injected. To this cylinder is connected, by means of a ball and socket joint, a mold comprising a plurality of separable elements, and a mechanism, including a further ball and socket connection, which serves to keep the mold pressed against and centered with respect to the injection nozzle of said cylinder, so that the outlet or discharge orifice of the latter remains in communication with an inlet orifice of said mold.

The device is further equipped with a heating member for heating the mold when it is in place for injection.

It is, therefore, an object of the invention to provide means affording ready alignment of the injection cylinder with the cylinder of the mold, which is operatively connected to said injection cylinder.

It is another object of the invention to provide means facilitating easy assembly and disassembly of the parts of which the mold consists.

These and other objects will be gathered from the ensuing description, claims and drawing, which latter shows, by way of example, an embodiment of the device made in accordance with the invention.

The device illustrated in longitudinal section comprises an injection cylinder 18 in which a piston 20 is movable; the latter ensures the expulsion, through a pipe 27 arranged in discharge nozzle 17, of material 21 to be injected into a mold 30.

The nozzle 17 forms a socket with recess 28 in which a ball-shaped projection 13 of a cap 4 of the mold engages. The latter is kept pressed against the nozzle 17 by a plunger or push-rod 12 which terminates in a ball-shaped part or projection 11 and forms part of a press (not shown).

The projection 13 is formed with a channel or orifice 29 which is centered with respect to and communicates with the pipe 27.

The mold 30 comprises a die consisting of at least one cylindrical or female member 5 on which the cap 4 is fitted with slight friction.

Inside the aforesaid die there is accommodated a plunger or male member 7 having a head or extension 31 which is provided with projections 14 that conform to the shape of the internal face of the cap 4; the latter ensure the centering of the plunger or male member 7 and the formation of apertures in the head 1 of the molded container wall 3, these apertures being employed subsequently for emptying the container. The plunger 7 comprises a base or socket 9 provided with a fitting or bearing surface 32 which ensures centering of the rear end of said plunger 7 on cylinder wall 5. This plunger 7 comprises an axial bore 10 which receives a cooling liquid and which engages said ball-shaped projection 11 of the end of the push-rod 12 which passes through a plate 26 of the device.

The mold 30 is housed in a heating chamber 22 which surrounds tube 16, injection cylinder 18 being provided with a heating member 19.

The device as described operates as follows:

The polyethylene molding material, in the form of granules, is introduced into the cylinder 18 whose wall is heated and in which the material is compressed by the piston 20; at the same time, the mold 30, which is placed on the plate 26, is displaced by the plunger or push-rod 12 in the direction of the arrow 25 so as to bring the projection 13 of the cap 4 of the mold into engagement with the recess 28 in the nozzle 17 and thus to bring the orifice 29 in registry with the orifice 28 of the pipe 27 of the nozzle 17. The result of this is that the thermo-plastic material expelled from the cylinder 18 by the piston 22 enters mold 30 between the die and the male member 7 where it forms the head 1 and the wall 3 of the tube. When the mold 30 is filled with the material, it is cooled by means of a liquid introduced into the bore 10; and the piston 20 and the push-rod 12 are then operated, the former so as to be displaced in the direction of the plunger 12 and the latter in the opposite direction. The mold 30 then comes to rest on the plate 26, the cap 4 is separated from the cylinder part 5 and the male member is withdrawn, and the molded tube is rotated so as to disengage its screw-threaded part 2 from the cap 4.

The three parts 4, 5 and 7 of the mold 30 are reassembled and introduced into the heating chamber 22 to be heated with a view to again receive polyethylene material.

A plurality of molds could be mounted on a revolving plate 26 so that they are presented successively beneath the injection nozzle 17.

Due to the fact that the cylinder 5 is provided with an inner wall surface and an outer wall surface with respective stepped-up or stepped-down fitting faces as shown, cap member 4, as well as the recessed socket 9 of the core or male member 7, may be readily interchangeably mounted on and assembled with the cylinder 5, whereby a space is provided above the socket 9 between adjacent wall surfaces of the cylinder and core or male member 7, on the one hand, and the inner wall surface of the cap member 4 and the male member extension 31, on the other hand.

It can thus be seen that there has been provided, in accordance with the present invention, a molding plant for manufacturing articles from thermo-plastic material; a female member having separable parts, a male member insertable into said female member and providing a space between adjacent wall surfaces defining said male member and said female member, respectively, a first ball and socket joint at one end of said female member for pivotally connecting the latter with the discharge nozzle of injection molding means, and a second ball and socket joint positioned at the end of said male member opposite said one end of said female member for actuating said male member relative to said first ball and socket joint.

Having thus described the invention, what is claimed as new and desired to be secured by Letters Patent is:

1. A device for manufacturing articles from thermo-plastic materials comprising a cylinder part within which an article is to be formed and having an inner wall and an outer wall, said inner wall and said outer wall being each provided with respective fitting means, a cap member interchangeably engageable with one of said fitting means at one end of said cylinder part, a male member including an extension and provided with a base having a socket, a ball-shaped element engageable with said socket to move said male member into said cylinder part, said extension projecting into said cap member, said male member providing a predetermined space between it and said inner wall of said cylinder part, said extension providing a space between it and the inner wall of said cap member, said base being engageable with the other of said fitting means of said cylinder part, whereby said cap member and said male member are respectively assembled with said cylinder part in close fit, said cap member being provided with a ball-shaped element having a passageway for registry with a recess of injection molding means, whereby thermoplastic material may be introduced from the latter into said cap member and for filling said spaces, respectively, provided between said male member and said cylinder part, as well as between said extension and said cap member.

2. A device according to claim 1, wherein said fitting means is provided at said one end of said cylinder part and on the outer wall thereof and engages a corresponding face provided on said cap member, which latter face forms centering means for said cap member.

3. A device according to claim 1, wherein said fitting means is provided at said other end of said cylinder part on said inner wall thereof and engages a corresponding face of said base which latter face forms centering means for said cylinder part.

4. A device according to claim 1, wherein said base and said male member are provided with channel means to facilitate cooling of said male member.

5. A device according to claim 4, wherein said channel means is centrally located with respect to said base and ball-shaped means engageable with said channel means for moving said base and said male member relative to said cylinder part.

6. A device according to claim 4, said channel means extending from said base into said male member and terminating adjacent said extension.

7. In a molding plant for manufacturing articles from thermo-plastic material; a female member having separable parts, a male member insertable into said female member and providing a space between adjacent wall surfaces defining said male member and said female member, respectively, a first ball and socket joint at one end of said female member for pivotally connecting the latter with the discharge nozzle of injection molding means and provided with channel means for establishing communication between said space and said nozzle, and a second ball and socket joint positioned at the end of said male member opposite said one end of said female member for adjusting said male member relative to said first ball and socket joint.

8. In a molding plant according to claim 7, wherein said separable parts of said female member comprise a cylindrical part and a hollow cap part frictionally and fittingly engaging one end of said cylindrical part, the other end of said cylindrical part being frictionally and fittingly engageable with said male member, said male member being provided with an extension, said extension projecting into the hollow of said cap member and being spaced therefrom, whereby said space between said adjacent wall surfaces of said male member and of said female member is extended into said cap member, said first ball and socket joint being arranged between said cap member and the nozzle of said injection means and being provided with channel means for establishing communication between said space and said nozzle.

ANDRÉ STRAHM.
ALBERT QUINCHE.

REFERENCES CITED

The following references are of record in the file of this patent:

UNITED STATES PATENTS

| Number | Name | Date |
|---|---|---|
| 2,070,242 | St. Clair | Feb. 9, 1937 |
| 2,377,393 | Wiley | June 5, 1945 |
| 2,403,042 | Bogoslowsky | July 2, 1946 |
| 2,410,510 | Lester | Nov. 5, 1946 |
| 2,443,053 | Parmelee | June 8, 1948 |
| 2,471,148 | Gale et al. | May 24, 1949 |